April 25, 1967 R. V. MATHISON 3,315,798
LITTER RECEPTACLES FOR AUTOMOTIVE VEHICLES AND THE LIKE
Filed Dec. 20, 1965 2 Sheets-Sheet 1
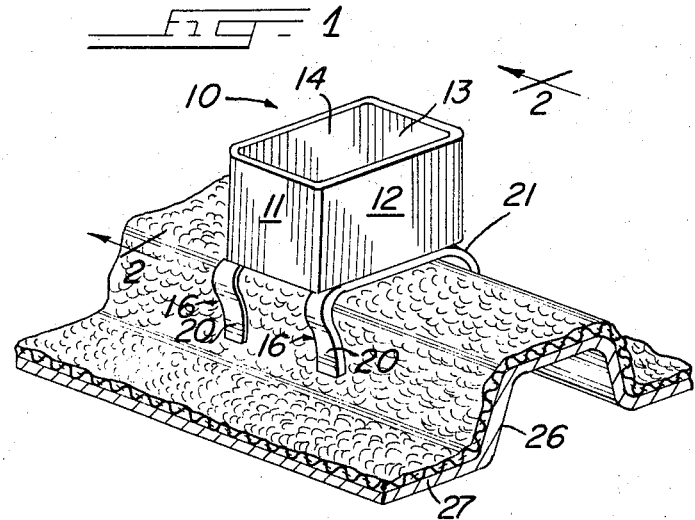
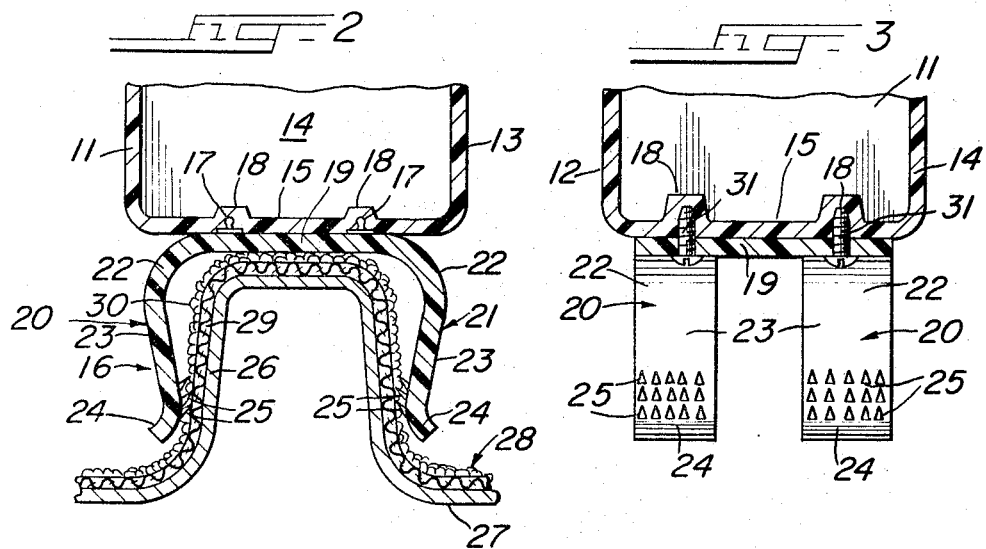
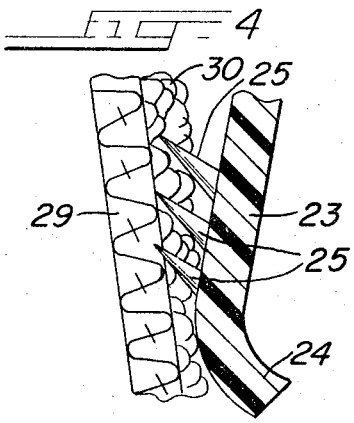
INVENTOR
ROBERT V. MATHISON
BY Marzall, Johnston, Cook & Root
ATTYS

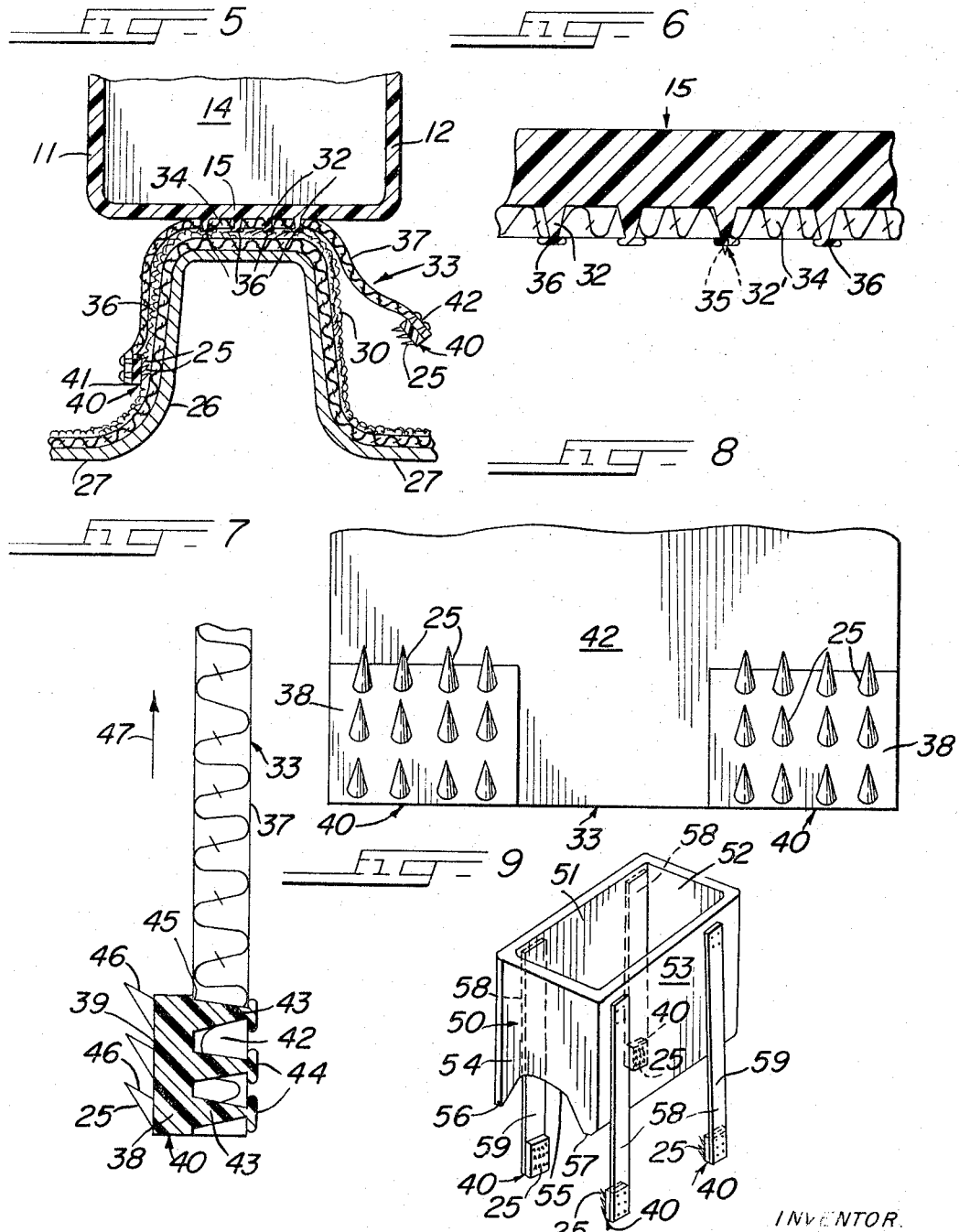

United States Patent Office 3,315,798
Patented Apr. 25, 1967

3,315,798
LITTER RECEPTACLES FOR AUTOMOTIVE
VEHICLES AND THE LIKE
Robert V. Mathison, 5 Woodcrest Road,
Asheville, N.C. 28804
Filed Dec. 20, 1965, Ser. No. 514,814
4 Claims. (Cl. 206—19.5)

This invention in general relates to refuse or litter containers or receptacles adapted for use in passenger compartments of automotive vehicles. The invention particularly pertains to receptacles or containers for disposal of refuse or litter, which containers are secured against tipping by fastening members which coact with floor carpeting of the passenger compartment.

A refuse container of the general type herein contemplated is described and illustrated in U.S. Patent No. 3,109,537, issued Nov. 5, 1963. The container has weighted, flexible flaps adapted to drape over opposite sides of the drive shaft tunnel ridge in the floor of the passenger compartment.

This invention provides improvements in this type of litter container through the provision of resilient fastener arms or flaps having small, tapered, sloping projections on the outer ends thereof. These projections penetrate the loops of loop pile carpeting or interstices of other types of floor carpeting and remain securely seated therein under elastic deformation of the fastener arms or flaps. They secure the container against tipping by accidental bumping or kicking thereof. On the other hand, the projections release readily from the carpeting when the litter container is to be removed or shifted.

The containers of the invention which utilize flexible elastic flaps may be supported securely on flat or uneven surfaces, e.g., on flat portions of the passenger compartment floor or on the aforesaid tunnel ridge. The containers of the invention which utilize resilient arms are suited particularly for mounting on the carpeting of the tunnel ridge.

Responsible citizens are becoming increasingly aware of the litter problem on streets and highways. Many municipalities and many states have street or highway anti-litter laws. The use of litter containers or bags in privately owned automobiles, therefore, for accumulation of paper and other waste is becoming increasingly popular.

It is a primary object of this invention to provide litter containers of the aforesaid type with improved structures for securely, but removably, mounting the containers in passenger compartments of automotive vehicles. Another object is to provide improvements in a refuse container for passenger compartments of automotive vehicles comprising, in combination, a refuse-receiving container having walls defining the sides and bottom thereof, at least one pair of resilient arms secured to said container and respectively extending near opposite sides thereof, the free ends of said arms projecting below the bottom of said container, and a plurality of small, tapered, sloping projections on the inner face of the free end of each of said arms, the axes of said projections sloping in a direction away from the respective inner face and away from the free end of the respective arms whereby said projections are adapted to be seated and held in carpeting on the floor of said passenger compartment under the elastic urging of said resilient arms.

A further object is to provide litter containers as aforesaid wherein said pair of arms comprises the legs of a U-yoke, the base of which is attached to the bottom of said container.

A still further object is to provide litter containers as aforesaid further characterized by detachable means holding said base of said U-yoke on the bottom of said container.

Another object is to provide litter containers as aforesaid wherein said arms are flexible, longitudinally elastic strips.

Still another object is to provide litter containers as aforesaid wherein said pair of arms comprises a pair of resiliently bendable strips respectively attached to opposite sides of said container and extending downwardly along the respective sides with said free ends thereof below the bottom of said container.

Another object is to provide litter containers as aforesaid wherein said pair of arms comprises a pair of flexible, longitudinally elastic strips respectively attached to opposite sides of said container and extending downwardly along the respective sides with said free ends thereof below the bottom of said container.

The foregoing and numerous other important objects, features, and advantages of the invention will be apparent as the same is more fully understood from the following description, which, taken in connection with the accompanying drawings, discloses preferred embodiments of the invention.

In the drawings:

FIG. 1 is a top, perspective view of a litter container embodiment in mounted relationship on a carpeted tunnel ridge in the floor (shown in fragment) of the passenger compartment of an automobile.

FIG. 2 is a fragmentary, section view taken on section plane 2—2 of FIG. 1.

FIG. 3 is a fragmentary, section view of another embodiment.

FIG. 4 is an enlarged, fragmentary, section view of the end of a resilient arm of FIGS. 1–3 and the relationship thereof with the carpeting on the side of the tunnel ridge.

FIG. 5 is a fragmentary, section view of another litter container embodiment on a carpeted tunnel ridge.

FIG. 6 is a fragmentary, enlarged section view showing the attachment of an elastic strip to the bottom wall of the litter container of FIG. 5.

FIG. 7 is a fragmentary, enlarged, section view of the end of an elastic strip as shown in FIG. 5 with a projection-containing member mounted thereon.

FIG. 8 is a side elevation of the inner face of the end fragment of an elastic strip as shown in FIG. 5.

FIG. 9 is a top, perspective view of another litter container embodiment.

Referring to the drawings, the embodiment of FIGS. 1, 2 and 4 comprises a rectilinear container 10 open at the top and having side walls 11, 12, 13 and 14 and a bottom wall 15. Container 10 may take any shape such as the cubic, cylindrical, oval, frusto-pyramidal, frusto-conical, etc. It may have a hinged or removable top. The top and/or the side and bottom walls may be solid walls or lattice walls.

At least one (two in the illustrated embodiment) U-shaped yoke arm 16 is secured removably to bottom wall 15 by male snap fastener elements 17 attached on the upper surface of flat base 19. Elements 17 snap into matingly shaped sockets in the raised portions 18 of bottom wall 15.

Besides flat base 19, the yoke arms 16 comprise resilient strips 20 and 21, each having upper, curved sections 22, converging leg portions 23 and outwardly-curved tips 24. The inner faces of the lower portions of legs 23 have a plurality of small, tapered, upwardly sloping projections 25 with relatively sharp tips. The arms 20 and 21 are resiliently springable away from each other whereby the U-yokes 16 can be spread.

The U-yokes 16 fit over the tunnel ridge 26 in the floor 27 of the automobile passenger compartment. The floor and tunnel ridge over covered with carpeting 28 comprising a fabric base layer 29 and a pile layer 30.

The yokes 16 are mounted over the tunnel ridge 26 by spreading leg portions 23 and placing the strips 20 and 21 in the position shown in FIGS. 1 and 2. The projections 25 will slide downwardly over pile layer 30 without catching. They penetrate the pile layer 30 and optionally also the fabric base layer 29 when the downward sliding of projections stops. Upward movement is resisted by the seating of said projections in the interstices of the pile layer 30, e.g., a loop pile, and/or the interstices of the fabric base layer 29. The undersides slope in a manner whereby they work deeper into the interstices and are held therein even more firmly when the projections move upwardly relative to the carpeted side walls of the tunnel ridge, e.g., when a force is applied in a manner tending to raise or tip sideways the container 10.

The projections release easily, however, whereby the litter container can be removed for dumping or the like. Resilient strips 20 and/or 21 need only be sprung outwardly, e.g., by gripping the same at leg portions 23 or tips 24, sufficiently to clear the projections 25 of the pile surface 30 and then raising the respective released strips and the container therewith.

The embodiment of FIG. 3 is similar in most respects to the embodiment of FIGS. 1 and 2. Where applicable, like numerals designate like parts. The projections 25 of both embodiments are arranged in three transverse rows of closely spaced projections. The essential difference between these embodiments is the use of screws 31, which thread in the thermoplastic polymer raised portions 18 in bottom wall 15, to attach the flat base 19 of yoke arm 16 to the bottom of container 10.

In the embodiment of FIGS. 5-8, the bottom wall 15 of container 10 is formed with a plurality of small, relatively sharp tipped, tapered projections 32 extending from the lower surface of the bottom wall 15. The original form thereof is shown in dotted lines as projection 32' in FIG. 6. The resilient arms in this embodiment are the end portions of at least one flexible, longitudinally elastic strips 33. Preferably two such strips are attached near opposite ends of the container 10. A preferred means for mounting strips 33 on the lower surface of said bottom wall comprises pressing the mid-portion 34 of strip 33 against the projections to cause the tips 35 to penetrate and protrude through the mid-portion 34. Heat and pressure are applied against tips 35 to deform the tips of the thermoplastic polymer projections 32 into enlarged heads 36 having a sufficient size to preclude extraction of projections 32 from the penetrated interstices of the elastic fabric strip 33. For further details, reference is made to my application Ser. No. 380,575, filed July 6, 1964.

The longitudinally elastic strips 33 need not be highly elastic, although they may be so, if desired. They are preferably woven or knotted elastic fabric strips or the like, the elastic fabric having interstices penetrable by projections, especially when strips 33 are secured to the container as above-described.

The remaining end portions 36 and 37 of strip 33 comprise the pair of flexible, longitudinally elastic arms extending near opposite sides of container 10. The projections 25 in this embodiment are tapered, sloping, relatively sharp-tipped thermoplastic polymer projections molded integrally with a substantially flat, small, thermoplastic polymer base 38. They are arranged on the inner face 39 of base 38 in closely spaced rows extending at right angles to the general direction of slope of the projections. The fastener element 40 (comprising base 38 and its projections 25) is described more fully in my U.S. Patent No. 3,214,816, issued Nov. 2, 1965.

At least one fastener element 40 is attached to each end 41 and 42 of strip 33. Thermoplastic polymer projections 43 with enlarged heads 44 (of the same kind as projections 32), which are integrally molded on outer face 45 of base 38, may be used for this purpose. Two, small fastener elements 40 attached at opposite corners of the inner faces of end portions 41 and 42 (FIG. 8) are preferred when strips 33 are relatively wide. For narrow strips 33, a single fastener element 40, extending completely or partially across the respective ends 41 and 42, suffices.

The litter container 10 is mounted on the carpeted tunnel ridge 26, by setting it on the upper portion thereof with end portions 36 and 37 of strip (or strips) 33 hanging along opposite sides of the tunnel ridge. The ends 41 and 42, singly or together, are pulled to stretch the strip 33. Projections 25 are pressed against the carpet pile 30 covering the side walls of tunnel ridge 26 while the stretch is maintained. When strip 33 is released, it tends to shorten, due to elastic recovery. This force causes the undersides (the shortest sides 46) of projections 25 to work deeper into the fabric interstices of the carpeting because the sides 46 slope relative to the direction of the elastic recovery force (indicated by arrow 47 in FIG. 7), thereby working the projections deeper into the interstices. The embodiment of FIGS. 5-8 offers the further advantage, because of the flexibility of the strip 33, of securing the container on many types of uneven or flat surfaces, e.g., on the flat floor of an automobile with front wheel drive, in which case the strip 33 lies flat on the floor and extends laterally from opposite sides of container 10.

To remove the container 10 from the tunnel ridge, the strip 33 need only be stretched slightly to relieve the elastic tension, whereon projections 25 can be easily pulled out of the interstices of the carpeting.

The embodiment of FIG. 9 is similar to the previously described embodiments. It comprises a litter receptacle or container 50 having side walls 51, 52, 53 and 54, each connected at their lower edges to an upwardly arched bottom wall 55. The arched bottom wall 55 provides parallel, spaced ridges 56 and 57 along the bottom wall, which rest on the carpeted floor, either on a flat portion or on the tunnel ridge. The arched bottom wall will accommodate various shapes of the top wall of tunnel ridges because it rests thereon only at the spaced ridges 56 and 57.

The receptacle 50 has at least one resilient arm attached to each wall 51 and 53. As illustrated, the walls 51 and 53 each have two resilient, downwardly extending arms 58 attached at the upper ends of said arms to the outer faces of walls 51 and 53 near their upper edges. Arms 58 may be thermoplastic polymer, resiliently springable strips similar in resilient properties to strips 20 and 21, or they may be flexible, longitudinally elastic strips similar to elastic strip 33. The lower portions 59 of arms 58 hang below bottom wall 55 and have on the inner faces of the lower ends fastener elements 40, which are shown in greater detail in FIGS. 7 and 8.

The embodiment of FIG. 9 is mounted on the carpeted tunnel ridge in the same manner as previously described for the embodiments of FIGS. 1-4 or of FIGS. 5-8. The projections 25 penetrate and grip in the file and/or fabric underlayer of the carpeting substantially as shown and described with particular reference to FIG. 4 and FIG. 7, depending upon the character of strips 58.

The projections 25 in all of the illustrated embodiments are characterized as small, tapered, sloping projections with sharp or slightly blunted tips. The axes of the projections and the shortest sides thereof slope at an acute angle to the face from which they project. The axes slope at an acute angle relative to said face of about 15-60°, while the shortest sides 46 slope at an acute angle relative to the face of about 20-70°. They are preferably conical or pyramidal when they have sharp tips and frusto-conical or frusto-pyramidal when they have slightly blunted tips.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A receptacle for passenger compartments of automotive vehicles comprising, in combination, a container having walls defining the sides and bottom thereof, flexible, longitudinally stretchable, elastic strip means secured to said container and providing at least two longitudinally elastic, substantially oppositely disposed, strip members with free ends extending below the bottom of said container, and a plurality of small, tapered sloping projections on the inner faces of the respective free ends of said strip means, the axes of said projections sloping away from the respective inner faces and away from the respective free ends and toward said receptacle, whereby said projections are adapted to be seated and held in carpeting on the floor of said passenger compartment with said strip means under elastic stretch.

2. A receptacle as claimed in claim 1 wherein said strip means comprises at least one longitudinally stretchable, elastic strip having its mid-portion attached to said bottom of said container, and opposite ends thereof constituting said free ends having said projections on the inner faces thereof.

3. A receptacle as claimed in claim 2 wherein said strip means comprises at least two longitudinally stretchable, elastic strips respectively attached to opposite sides of said container and extending downwardly along the respective sides with said free ends thereof below the bottom of said container.

4. A refuse container for passenger compartments of automotive vehicles comprising, in combination, a refuse-receiving container having walls defining the sides and bottom thereof, an inverted U-yoke attached to said bottom and depending therefrom, said U-yoke having a flat base seated against said bottom, upper, curved sections at opposite ends of said flat base, leg portions depending downwardly in converging relationship from respective curved sections and outwardly curved tips on the respective lower ends of said leg portions, said U-yoke being made of resiliently springable material whereby said leg portions can be resiliently spread apart, and a plurality of small, tapered, sloping projections on the inner face of the lower leg portion of each of said arms, the axes of said projections sloping in a direction away from the respective inner face and away from the free end of the respective arm and toward said container, said axes sloping, relative to said face, at an acute angle of about 15–60° and said projections having their respective shortest sides sloping, relative to said face, at an acute angle of about 20–70° whereby said projections are adapted to be seated and held in carpeting on the floor of said passenger compartment under the elastic urging of said resilient arms.

References Cited by the Examiner

UNITED STATES PATENTS

| | | | |
|---|---|---|---|
| 2,647,716 | 8/1953 | Hudziak | 248—226 |
| 2,686,701 | 8/1954 | Manczur | 248—226 |
| 2,867,248 | 1/1959 | Formey | 248—226 |
| 2,897,974 | 8/1959 | Cook. | |
| 3,081,865 | 3/1963 | Pugsley | 206—19.5 |
| 3,109,537 | 11/1963 | Larkin | 206—19.5 |
| 3,163,287 | 12/1964 | Barnett | 206—19.5 |
| 3,223,281 | 12/1965 | Larkin | 205—19.5 |

FOREIGN PATENTS 571,939    9/1945    Great Britain.

LOUIS G. MANCENE, *Primary Examiner.*